United States Patent [19]

Sander

[11] 3,924,470

[45] Dec. 9, 1975

[54] TEMPERATURE MEASUREMENT CIRCUIT

[75] Inventor: Duane E. Sander, Brookings, S. Dak.

[73] Assignee: Daktronics, Inc., Brookings, S. Dak.

[22] Filed: Sept. 28, 1973

[21] Appl. No.: 401,701

[52] U.S. Cl. ........................... 73/362 AR; 323/75 H
[51] Int. Cl.² ........................................ G01K 7/24
[58] Field of Search ............... 73/359, 362 AR, 361; 307/310; 323/75 H

[56] References Cited
UNITED STATES PATENTS

| | | | |
|---|---|---|---|
| 2,591,358 | 4/1952 | Imlev ................................. | 73/359 |
| 3,562,729 | 2/1971 | Hurd ................................. | 73/359 X |
| 3,680,384 | 8/1972 | Grindheim ......................... | 73/361 |
| 3,688,580 | 9/1972 | Jarzembski ........................ | 73/361 |
| 3,695,112 | 10/1972 | Possell ............................. | 73/362 AR |
| 3,721,001 | 3/1973 | Crosby et al. .................... | 73/362 AR X |
| 3,738,174 | 6/1973 | Waldron ........................... | 73/362 AR |
| 3,842,674 | 10/1974 | Wilbur et al. .................... | 73/362 AR |

Primary Examiner—Richard C. Queisser
Assistant Examiner—Frederick Shoon
Attorney, Agent, or Firm—Keith B. Davis

[57] ABSTRACT

A multiamplifier measurement circuit in which each amplifier thereof is a differential amplifier and in which the inputs of each differential amplifier are balanced to provide a temperature stable measurement circuit. In a preferred embodiment, the measurement circuit includes a measurement amplifier, reference amplifier, and output amplifier; the measurement amplifier inputs are connected across opposite sides of a measurement bridge including a thermoelectric transducer in one leg thereof, and the reference amplifier inputs are connected across opposite sides of an offset adjustment bridge including a potentiometer in one leg thereof for adjusting the circuit offset. The output amplifier inputs are respectively connected to the measurement and reference amplifier outputs. The reference and measurement amplifier output impedances are equal which together with the connection of each of the measurement and reference amplifiers across a bridge provides a multiamplifier measurement circuit in which each of the amplifiers have balanced input impedances to provide a temperature stable measurement circuit.

10 Claims, 3 Drawing Figures

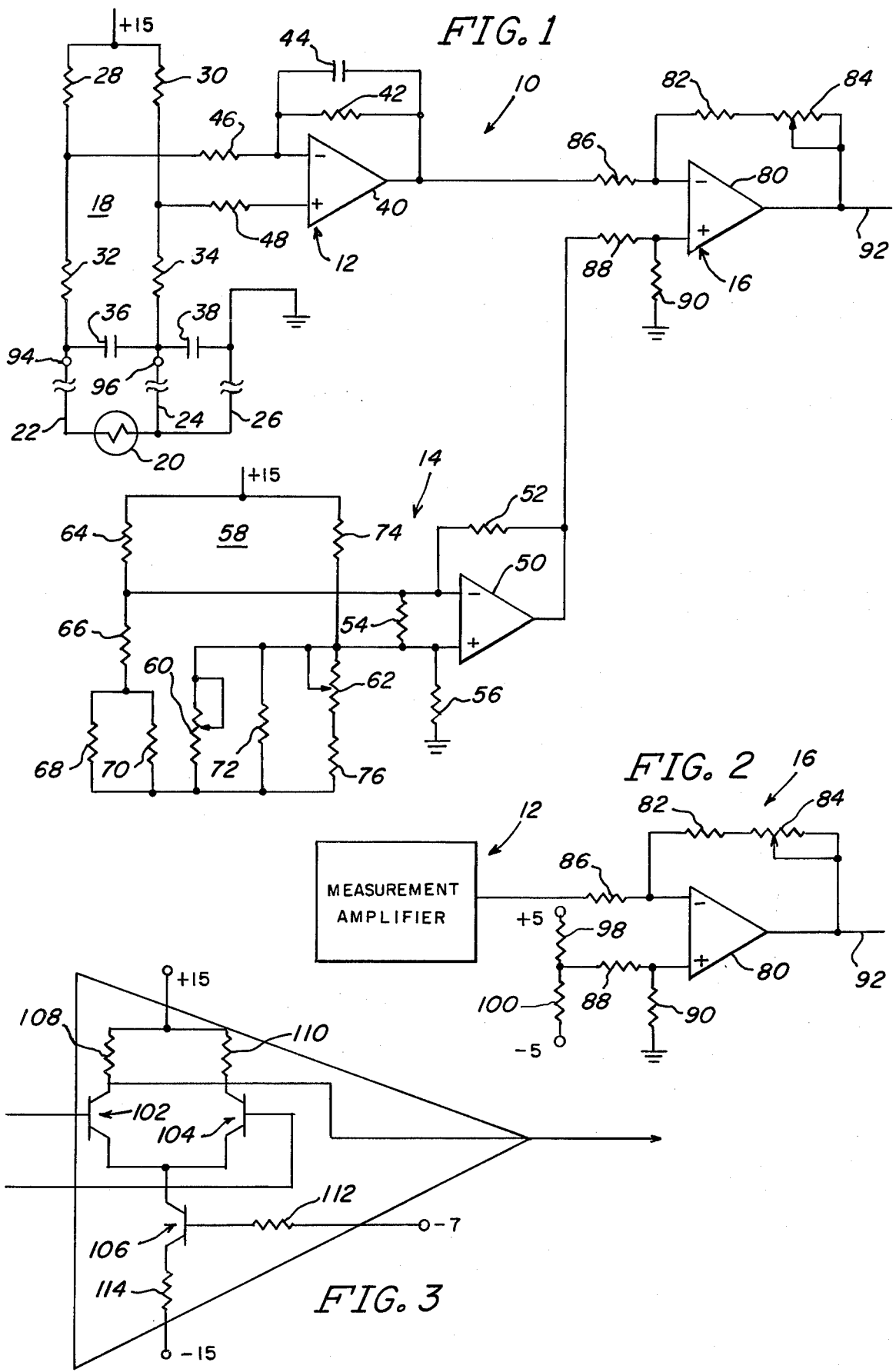

TEMPERATURE MEASUREMENT CIRCUIT

BACKGROUND AND FIELD OF THE INVENTION

In general the invention relates to measuring apparatus and methods, and, more particularly, to such apparatus and methods for measuring temperatures, and specifically to apparatus and methods for applications known as time and temperature measurement.

A temperature measuring circuit produces an output signal which varies in accordance with temperature variations of the environment being measured.

For a particular application, the circuit is designed to measure a temperature range, which measurement range shall be designated herein as the range of temperatures from $t_0$ through $t_1$.

The relationship between the measurement parameter (temperature) and the measuring circuit output signal may conveniently be graphically represented as a line graph in which temperature throughout the measurement range $t_0$ through $t_1$ is the Y or vertical axis and the measurement circuit output signal in current or voltage is the X or horizontal axis.

Typical measurement circuits include a thermoelectric transducer or temperature sensor, and one or more amplifiers. Generally, the greater the measurement temperature range, the more amplifiers, and for large temperature measurement range such as from minus 30° to plus 130°F, for all practical purposes, at least three amplifiers are required. Such sensors and amplifiers are typically made as linear as possible in order that a plot of their measurement signal output over the range of measurement temperatures is as linear as possible, i.e. is a straight line if plotted as a line graph.

A measuring device includes a measurement circuit and in addition also includes a readout responsive to a measurement signal from the measurement circuit to provide a temperature readout in a form intelligible to the human eye. Such readouts are numerous and well known in the art and include digital temperature readouts and pen recording temperature readouts for producing graphic plots of temperature as a function of time. Digital temperature readouts have widespread application, and are frequently found in combination with time clocks in what are known as time and temperature signs.

Of course a measuring circuit and readout must be properly matched. For a one degree temperature change of the measured environment, the measurement circuit signal must change by an amount which will cause the readout to change its indication of temperature one degree. This matching can be thought of in terms of the slope of angle of the line graph of measurement signal versus temperature for the measurement circuit. The circuit adjustment or circuit characteristic by which the slope or angle of the line graph is varied is referred to as "gain". As an illustration of gain adjustment, if a readout device was changed from one requiring one unit of measurement signal to one requiring two units of measurement signal per one degree change in the actual temperature of the measured environment, the measurement circuit amplifier gain would be adjusted such that a change of one degree in the measured environment temperature would produce two units of change in the measurement signal. The line graph of temperature versus measurement signal for the adjusted gain amplifier circuit would have a steeper slope than the graph for the circuit prior to adjustment.

A further circuit adjustment necessary to match a measurement circuit to a readout is commonly referred to as the "offset" adjustment. The offset adjustment fixes the level or magnitude of the measurement signal for a reference temperature, such as zero degrees, 32°, or any other arbitrary calibration temperature. Offset adjustment in terms of the line graph can be thought of as changing or selecting the Y-axis intercept of the line graph.

Although it is nearly always desirable to minimize the need for calibration for such adjustments, for certain applications such as "remote" applications examples of which are most time and temperature applications, it is particularly desirable to minimize the need for calibration. Calibration of remote applications is costly, both from a monetary standpoint and from a standpoint of customer good will to say nothing of complications resulting from restrictions inherent to remote repair such as inferior or other limitations of portable equipments and less than optimum working conditions.

The prior art includes both single amplifier and multiamplifier measurement circuits. Examples of single amplifier measurement circuits are disclosed in U.S. Pat. No. 3,503,261 which issued Mar. 31, 1970 to H. A. Riester et al., and U.S. Pat. No. 3,592,059 which issued July 13, 1971 to George E. Chilton. Both patents describe and disclose a single amplifier circuit, and the amplifier of each circuit has its inputs connected across a bridge to inherently provide nearly balanced inputs apparently merely as an expedient way to measure a small temperature range of about 50°F. with a single amplifier. Examples of multi-amplifier measurement circuits are disclosed in U.S. Pat. No. 3,695,112 which issued Oct. 14, 1970 to Clarence R. Possell and U.S. Pat. No. 3,363,462 which issued Jan. 16, 1968 to C. M. Sabin. These latter patents disclose amplifiers none of which include inherently balanced inputs.

A general object of the present invention is a measurement circuit which is highly reliable and stable.

An object of the present invention is a measurement circuit which will measure a large temperature range including both positive and negative temperatures yet which is reliable, economical to construct, and readily recalibrated on the infrequent occasions when calibration is necessary.

A further object of the invention is a measurement circuit which is temperature stable to reduce the need for calibration of the circuit.

BRIEF DESCRIPTION OF INVENTION

Briefly, the measurement circuit of the present invention includes a measurement and an output amplifier. The input impedances of each amplifier are balanced to provide a temperature stable measurement circuit. According to a preferred embodiment, the measurement circuit also includes a reference amplifier; the measurement amplifier input impedances are equal and the reference amplifier input impedances are balanced. The measurement and reference amplifiers have the same output impedance, and have their outputs coupled to the inputs of the output amplifier to provide a measurement circuit in which each amplifier of the circuit has balanced input impedances.

In a preferred embodiment specifically designed for a time and temperature application the amplifiers are each an operational amplifier; the measurement amplifier input is a "measurement" bridge which includes a thermoelectric transducer in one leg thereof; and the reference amplifier input is an "offset" bridge including a potentiometer in one leg for offset adjustment to provide not only a temperature stable circuit but a circuit in which offset and gain adjustments are independent when such adjustment is necessary.

For purposes of the present invention input impedances are considered balanced (or equal or the same) provided the difference between the impedances is less than about 3 percent of the impedance nominal value. To illustrate, for a nominal input impedance value of ten thousand ohms, the input impedances may differ by up to about three hundred ohms; for example, one input could have an actual value of 9,850 ohms and the other an actual value of 10,150 ohms; or, as another example, one could have an actual value of 10,000 ohms and the other a value of 9,700 ohms. It should be noted that the nominal input impedance values of two different amplifiers need not be balanced; i.e. the nominal input impedance of one could be 5,000 ohms, that of another, 10,000 ohms.

Having thus briefly described the principles underlying and the basic elements of the present invention, how to make and use the invention including an embodiment of the invention specifically designed for a time and temperature application shall now be taught by means of the following description of the Figures.

BRIEF DESCRIPTION OF FIGURES

FIG. 1 is a schematic drawing of a multiamplifier measurement circuit according to the present invention incorporating integrated circuit operational amplifiers and specifically designed for a time and temperature application;

FIG. 2 is a schematic diagram of another multiamplifier measurement circuit according to the present invention for relative temperature measurement; and FIG. 3 is a schematic diagram of an embodiment of a discrete component operational amplifier circuit equivalent to the integrated circuit operational amplifiers of FIGS. 1 and 2.

DETAILED DESCRIPTION OF INVENTION

Referring now to FIG. 1, a measurement circuit is shown generally as 10. The circuit includes a measurement, reference and output amplifier shown respectively as 12, 14 and 16. The measurement amplifier 12 inputs are connected across a bridge circuit shown generally as 18. Bridge circuit 18 includes in one leg thereof a thermo-electric transducer 20 for measuring the temperature of an environment such as the environment of a time and temperature sign measurement application. For a typical time and temperature application, transducer 20 is mounted in a protective teflon covering with adhesive for adhering the transducer to a plastic plate. The plate is enclosed in a protective metal housing with the transducer 20 out of contact with the housing. The teflon covering, plate, and housing are not shown, are not considered critical to the present invention, and are intended to be located such that the ambient temperature they are exposed to does not exceed minus 30 or plus 130°F. Connection of transducer 20 to the remainder of bridge circuit 18 is by means of electrical conductors 22, 24 and 26 which, as illustrated by the schematic convention of broken lines, are comparatively long lines; they may be conventional three conductor house wiring. Conductors 22, 24 and 26 connect to a conventional terminal block. The terminal block connects through a calibration jack to an edge connector, both also conventional and well known. The printed circuit card on which the balance of measurement circuit 10 is assembled mates with the connector. The remainder of bridge circuit 18 comprises resistors 28, 30, 32 and 34 and capacitors 36 and 38. Capacitors 36 and 38 eliminate radio frequency interference in the temperature circuit. The principal element of measurement amplifier 12, as is the case for the reference amplifier 14 and output amplifier 16, is an operational amplifier 40. The otherwise infinite gain of basic amplifier 40 is limited to a finite low frequency gain of 10 by a feedback network which comprises resistor 42 and capacitor 44. The combination of the basic amplifier 40 and feedback network provide a differential amplifier. Measurement amplifier 12 also includes input resistors 46 and 48. These resistors form part of the input impedance to amplifier 12. The designation of "input" resistors (and the like designation hereinafter of the input resistors of amplifiers 14 and 16) is arbitrary; the resistors 46 and 48 could instead be just as well designated as output resistors (of bridge 18) or interface resistors (between bridge 18 and amplifier 12). Reference amplifier 14 includes a basic amplifier 50, feedback resistor 52, input resistors 54 and 56 and an input circuit 58. Input circuit 58 is also a bridge circuit and provides the function of offset adjustment by means of a pair of potentiometers identified in the figure as reference numerals 60 and 62 which respectively provide coarse and fine adjustment of offset. The remainder of input circuit 58 comprises resistors 64, 66, 68, 70, 72, 74 and 76. Output amplifier 16 comprises a basic amplifier 80, feedback resistors 82 and 84, the latter of which is a potentiometer and provides a second function, namely gain adjustment, and input resistors 86, 88 and 90. The signal from output amplifier 16 is a measurement signal equal to the difference between a reference signal from reference amplifier 14 and a measured signal from measurement amplifier 12 as amplified by output amplifier 16. The output amplifier 16 output is provided on lead 92 and, as previously described, is controlled in accordance with the offset adjust circuit 58 and gain potentiometer 84 to provide a signal to a readout device (not shown) at a magnitude which varies for each unit of actual temperature change, as sensed by thermo-electric transducer 20, an amount corresponding to a temperature increment of the readout device. A preferred embodiment of a time and temperature measurement circuit according to FIG. 1 measures a large temperature range from minus 30° to plus 130°F when made from components as set forth in the following table:

TABLE 1

| | | |
|---|---|---|
| Plastic plate - | ¼ inch Plexiglass | Calibration jack - Miniature phone jack with make and break connection. Switchcraft Part No. 42A |
| Metal housing - | 0.050 inch thick aliminum formed to a 5 inch square box. | |
| Terminal block - | Five terminal barrier strip-conch Part | Edge connector - 18-pin card-edge connector. Conch Part No. 50-18A-20 |

TABLE 1-continued

No. 5-164-Y

Amplifier 12

Integrated Circuit - 40, ½ SN72558

| Resistors - | | Capacitors - | | |
|---|---|---|---|---|
| 28=6.57 | kil ohm | 36=0.01 | micro farad | |
| 30=6.57 | kil ohm | 38=0.01 | micro farad | |
| 32=100.0 | ohm | 44=1. | micro farad | |
| 34=200.0 | ohm | | | |
| 42=10.7 | kil ohm | Thermoelectric transducer 20=100 ohm | | |
| 46=1.0 | kil ohm | nickel wire sensor | | |
| 48=1.0 | kil ohm | Baldwin-Lima-Hamilton Part No. RTNM-56F-10 | | |

Amplifier 14

Integrated Circuit - 50 = ½ SN72558

Resistors -
52=1.0 kil ohm
54=10.7 kil ohm
56=10.7 kil ohm
60=0 to 10 kil ohm potentiometer, 10 turn, wire wound
62=0 to 100 kil ohm potentiometer, 10 turn, wire wound
64=10.7 kil ohm
66=1.0 kil ohm
68=150.0 ohm
70=100.0 ohm, temperature sensitive semiconductor device T.I. Part No. TC1/8
72=1.3 kil ohm
74=10.7 kil ohm
76=50.0 kil ohm

Amplifier 16

Integrated circuit - 80 = ½ SN72558

Resistors -
84=0 to 10 kil ohm potentiometer, wire wound
82=10.7 kil ohm
86=10.7 kil ohm
88=10.7 kil ohm
90=15.0 kil ohm Use of a measurement circuit 10 is effected by first calibrating the circuit. To calibrate the circuit, for the preferred embodiment circuit of FIG. 1 constructed with components as set forth in Table 1, fixed resistances corresponding respectively to the resistances corresponding to the resistance of the thermoelectric transducer at a low and at a high temperature are alternately inserted into the test jack receptacles, shown in FIG. 1 schematically as points 94 and 96. For the preferred embodiment of FIG. 1 and Table 1, calibration resistors of 69.1 and 122.6 ohms respectively corresponding to temperatures of minus 40 and plus 140 degrees Fahrenheit are employed. A digital volt meter (DVM) having a range of at least ± 1.999 volts is connected to read the voltage of the temperature measurement signal on lead 92. After noting the meter reading for both calibration resistors, the difference between the readings is calculated and the circuit gain adjusted by means of variable potentiometer 84 according to whether the difference between the meter readings was more or less than 1.8 volts. (The readout device used in conjunction with the measurement circuit, a three and one-half unit digital volt meter, is a 0.01 volt per degree device and thus the correct measurement signal voltage differential for calibration resistors corresponding to a temperature difference of ten degrees is 0.1 volts.) The process of alternating the calibration resistors, noting the differential between readings, and adjusting circuit gain is repeated until a differential of 1.8 is obtained. Following attainment of the desired gain adjustment, offset adjustment is made. For the aforementioned readout device, a temperature signal voltage of +0.752 corresponds to a temperature of +75.2° Fahrenheit which in turn corresponds to a thermoelectric transducer resistance of 101 ohms. A 101 ohm resistor is inserted into the test jack and first the offset coarse adjustment potentiometer 60 and then the fine adjustment potentiometer 62 adjusted until the DVM registers a temperature signal voltage of 0.752 volts at which time the measurement circuit is properly calibrated for both gain and offset over a range of 150°. It should be noted that the adjustment of circuit gain is totally independent of the circuit offset. Because the output resistance of the reference operational amplifier 14 is independent of its input resistance, i.e. the output resistance is essentially a constant, gain is dependent solely upon the adjustment of potentiometer 84.

Referring now to FIG. 2, a circuit for measuring relative temperature is shown, i.e. a circuit for measurement of changes in temperature as opposed to the circuit of FIG. 1 which provides absolute temperature measurement. The circuit of FIG. 2 differs principally from that of FIG. 1 in that the reference amplifier is replaced with impedance means. For purposes of the preferred embodiment illustrated in FIG. 2, the impedance means is a voltage divider network comprising a fixed resistor 98 and another fixed resistor 100 connected between plus and minus five volts. The valves of resistors 98 and 100 are selected as required to provide a calibration signal to differential amplifier 80 which relative to the calibration signal from measurement amplifier 12 produces the required output signal on lead 92, for example a signal which nulls the readoutout device used in conjunction with the circuit or otherwise operates the readout device according to the conditions for calibration of the circuit.

Referring now to FIG. 3, a discrete component implementation of a circuit suitable for use as each of basic amplifiers 40, 50, and 80 of FIGS. 1 and 2 is shown. Briefly, the circuit comprises a pair of input transistors 102 and 104, a current source transistor 106, each of which transistors may comprise an NPN bipolar transistor, and bias resistors 108, 110, 112, and 114. Resistors 108 and 110 are selected to provide a large voltage gain of from 10,000 to 100,000, and resistors 114 and 112 selected to provide the desired current through transistor 106 namely that which provides an amplifier current gain of at least 10,000 and output impedance of less than one-hundred ohm.

Having taught how to make and use the best mode of the invention contemplated by the inventor, no further description shall be made other than to point out that the foregoing is given by way of illustration and not by way of limitation and that the full, true and complete scope of the invention includes modifications and varifications of the foregoing invention obvious to one of ordinary skill in the art.

What is claimed is:

1. A measurement circuit comprising:
   A. an output amplifier having a positive input and a negative input for providing an output signal representative of temperature and proportional to the difference between a measured signal and a reference signal throughout a measurement range;
   B. a measurement amplifier having a positive input and a negative input and having an output connected to one of the inputs of said output amplifier to provide said measured signal to said output amplifier;
   C. input means to said measurement amplifier selected to provide balanced impedances to said measurement amplifier positive and negative inputs throughout the measurement range;
   D. a thermoelectric transducer for providing a signal representative of temperature to an input of said measurement amplifier; and
   E. impedance means having an impedance balanced to the output impedance of said measurement amplifier and connected to the input of said output amplifier not connected to the output of said measurement amplifier to provide a multiamplifier temperature measurement circuit each of the amplifiers of which have balanced input impedances throughout the measurement range whereby the circuit is temperature stable over long periods of time.

2. A measurement circuit according to claim 1 wherein said input means to said measurement amplifier is a bridge connected across the inputs of said measurement amplifier and wherein said thermoelectric transducer is connected to one leg of said bridge.

3. A measurement circuit according to claim 1 wherein said impedance means is an offset bridge including variable impedance means in one leg thereof to provide a measurement circuit having offset adjustment capability.

4. A measurement circuit according to claim 3 wherein said impedance means further comprises a reference amplifier having a positive and negative input and in which opposite sides of said bridge are connected across said positive and negative inputs.

5. A measurement circuit according to claim 1 wherein said impedance means is a voltage divider network.

6. A measurement circuit according to claim 5 wherein said voltage divider network includes a variable impedance means.

7. A measurement circuit according to claim 3 wherein said output amplifier and said measurement amplifier each comprises a differential amplifier.

8. A measurement circuit according to claim 7 wherein each said differential amplifier comprises an operational amplifier.

9. A measurement circuit according to claim 3 wherein said input means to said measurement amplifier is a measurement bridge connected across the inputs of said measurement amplifier.

10. A measurement circuit according to claim 9 wherein said output amplifier and said measurement amplifier each comprise an operational amplifier.

* * * * *